United States Patent
Singh et al.

(10) Patent No.: US 10,009,291 B1
(45) Date of Patent: Jun. 26, 2018

(54) PROGRAMMABLE SWITCHING FABRIC FOR DYNAMIC PATH SELECTION

(71) Applicant: Amazon Technologies, Inc., Seattle, WA (US)

(72) Inventors: Bijendra Singh, Cedar Park, TX (US); Mark Anthony Banse, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 89 days.

(21) Appl. No.: 14/977,120

(22) Filed: Dec. 21, 2015

(51) Int. Cl.
*H04L 12/927* (2013.01)
*H04L 12/937* (2013.01)
*H04L 12/40* (2006.01)
*H04L 12/947* (2013.01)
*H04L 29/06* (2006.01)

(52) U.S. Cl.
CPC ...... *H04L 47/805* (2013.01); *H04L 12/40071* (2013.01); *H04L 12/40078* (2013.01); *H04L 49/25* (2013.01); *H04L 49/254* (2013.01); *H04L 29/06829* (2013.01); *H04L 63/101* (2013.01)

(58) Field of Classification Search
CPC ...... H04L 47/805; H04L 12/40071–12/40084; H04L 2012/5678–2012/5681; H04L 49/254; H04L 63/0485; H04L 29/06829; H04L 63/101
See application file for complete search history.

(56) References Cited

U.S. PATENT DOCUMENTS

| 6,467,002 | B1 * | 10/2002 | Yang | G06F 13/362 710/116 |
| 7,376,125 | B1 * | 5/2008 | Hussain | H04L 45/00 370/352 |
| 7,636,356 | B1 * | 12/2009 | Melman | H04L 47/10 370/392 |
| 7,917,680 | B2 * | 3/2011 | Locker | H04L 67/322 710/311 |
| 8,478,707 | B1 * | 7/2013 | Ong | H04L 45/54 706/47 |
| 2002/0021701 | A1 * | 2/2002 | Lavian | H04L 47/2433 370/401 |
| 2005/0021491 | A1 * | 1/2005 | Horgan | H04L 47/10 |
| 2005/0047411 | A1 * | 3/2005 | Kadambi | H04L 12/46 370/389 |

(Continued)

OTHER PUBLICATIONS

U.S. Appl. No. 15/169,571, filed May 31, 2016, Titled: Packet Forwarding Using Programmable Feature Prioritization.

*Primary Examiner* — Edan Orgad
*Assistant Examiner* — Ivan O Latorre
(74) *Attorney, Agent, or Firm* — Kilpatrick Townsend & Stockton LLP

(57) ABSTRACT

A programmable switch fabric can allow dynamic path selection for a specific class of packets using programmable action codes. Multiple packet processors inside a switch can process an incoming packet simultaneously and can make a decision (e.g., drop, forward, copy, etc.) related to the packet. A specific reassignment action code can be associated with the decision that needs to be prevailed for a specific class of packets. A priority arbiter can reassign the priority based on the specific reassignment action code so that the action associated with that action code prevails in the decision provided by the priority arbiter.

20 Claims, 11 Drawing Sheets

(56) References Cited

U.S. PATENT DOCUMENTS

| | | | |
|---|---|---|---|
| 2005/0159181 A1* | 7/2005 | Gadgil | H04L 47/50 455/554.2 |
| 2007/0206602 A1* | 9/2007 | Halabi | H04L 45/00 370/395.4 |
| 2009/0086664 A1* | 4/2009 | Wu | H04W 40/02 370/328 |
| 2009/0196245 A1* | 8/2009 | Ji | H04L 1/0025 370/329 |
| 2010/0046368 A1* | 2/2010 | Kaempfer | H04L 47/10 370/231 |
| 2010/0246436 A1* | 9/2010 | Yang | H04L 41/0803 370/254 |
| 2011/0131385 A1* | 6/2011 | Henriksson | G06F 13/1642 711/158 |
| 2012/0317322 A1* | 12/2012 | Chirca | G06F 13/1663 710/244 |
| 2013/0339545 A1* | 12/2013 | Shenoi | H04L 12/40163 709/240 |
| 2014/0101663 A1* | 4/2014 | Dickson | G06F 9/5038 718/103 |
| 2015/0067291 A1* | 3/2015 | Miyamoto | G06F 3/0659 711/167 |
| 2015/0236982 A1* | 8/2015 | Edsall | H04L 49/25 370/235 |
| 2016/0044695 A1* | 2/2016 | Gunner | H04L 49/90 370/336 |
| 2016/0373362 A1* | 12/2016 | Cheng | H04L 47/2433 |
| 2017/0075838 A1* | 3/2017 | Nooney | G06F 13/37 |

* cited by examiner

500

| PACKET PROCESSOR 502 | ACTION CODE 504 | NORMAL PRIORITY 506 | FINAL PRIORITY 508 |
|---|---|---|---|
| LPM | 0x00 | 100 | 99 |
| IP OPTIONS | 0x10 | 99 | 100 |
| IP-IN-IP/GRE TUNNEL | NOP | 98 | 98 |

FIG. 5

PROGRAMMABLE SWITCHING FABRIC FOR DYNAMIC PATH SELECTION

BACKGROUND

In computer networking, switches or routers can be used to process and transfer packets among various devices on a network or across networks. Generally, a packet entering a switch is processed by multiple modules inside the switch at the same time. Each module makes a decision about the packet and forwards its decision to a priority arbiter. The priority arbiter considers the decisions from the participating modules and makes a decision on the packet based on a pre-configured priority. For example, the decision can be to drop the packet or to forward the packet via a port. The packet can then be dropped or forwarded accordingly by the switch.

Generally, the priority arbiter makes the decision regarding the packet based on a priority that is pre-configured at a start time. Hence, once the switch is deployed in the field, priority cannot be changed without requiring a re-spin of the switch resulting in unnecessary costs in terms of time and money.

BRIEF DESCRIPTION OF THE DRAWINGS

Various embodiments in accordance with the present disclosure will be described with reference to the drawings, in which:

FIG. 5 illustrates a table showing reassignment of priorities based on the action code, according to some embodiments of the disclosed technologies.

DETAILED DESCRIPTION

Figure 1:
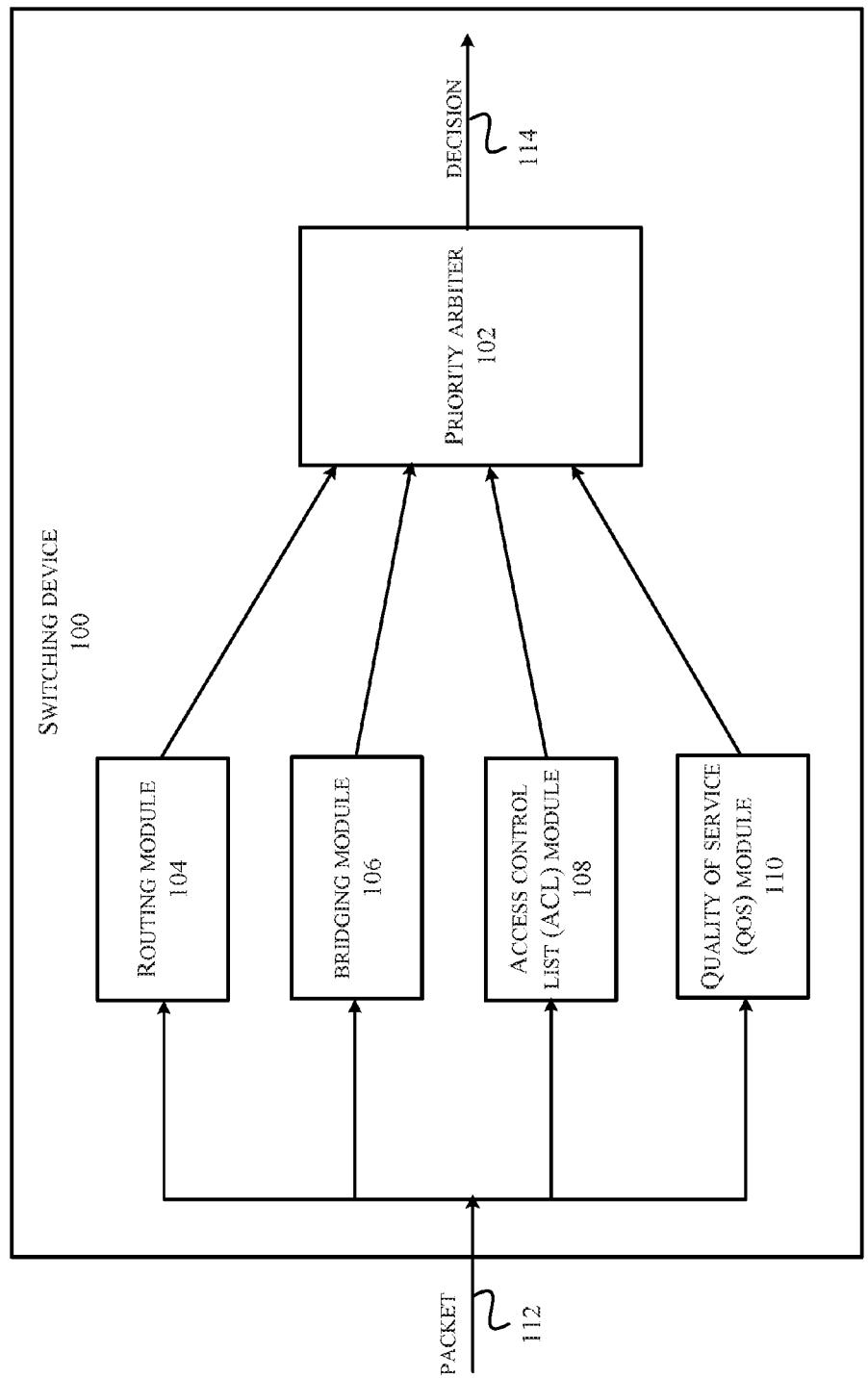
FIG. 1 illustrates a switching device comprising modules for processing a packet.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Generally, a switch functions as an interconnecting device to connect different devices on a network or over networks using a plurality of ports. The switch may support any packet protocol and may operate at data link layer (layer 2) or network layer (layer 3) of the OSI (open systems interconnection) model. For example, the packet may be an Internet Protocol (IP) packet that can carry data over a packet switched network (e.g., the Internet) based on a network protocol (e.g., Transmission Control Protocol (TCP)/IP). The switch may receive a packet on one of its ports from a source device (e.g., a computer) for sending it to a destination device (e.g., another computer or a router). For example, the packet may be part of a traffic stream that includes a sequence of packets. The packet typically can include payload data and a header that includes packet information. For example, the header may include source and destination physical addresses (e.g., IP addresses of respective devices), a protocol version (e.g., IPv4 or IPv6), a length of the packet, error correction data, and any other useful information. In some instances, the header can include IP options that can provide additional information on how to handle the packet. The IP options fields may include option types, option length and option numbers. The option numbers may include different values for different options, e.g., trace route, record route, time stamp, security classification, source routes, etc. In some instances, the packet can be a layer 2 (L2) packet, e.g., an Ethernet packet. For example, the header of the L2 packet may include source and destination addresses (e.g., media access control (MAC) addresses) of the source and destination devices connected to the switch in a network. In some instances, the packet can be an Ethernet frame that includes an IP packet.

A switching fabric may include a combination of hardware and software associated with a switch. For example, a packet entering a switch on a port goes through the switching fabric before going out via another port of the switch. In some implementations, a switching fabric may include multiple packet processing modules to process the packet and a priority arbiter to make a decision about the packet. For example, the multiple packet processing modules may include a routing module, a bridging module, an access-control-list (ACL) module, a quality-of-service (QoS) module and any other relevant modules. Generally, a packet entering a switch through one of the ports of the switch is processed by one or more packet processing modules simultaneously. In most instances, a packet processing module makes a decision about the packet based on a context and a type of the packet. For example, the decision may include whether the packet should be dropped, forwarded, copied to multiple ports, etc., and a port for forwarding the packet as necessary. The routing module may make a decision to forward the packet to a particular port for routing to a particular destination (e.g., another device or network) based on certain fields in the packet (e.g., IP header, routing address, routing type, etc.). Packets with different IP options may be handled by the routing module differently based on the configuration of the system. The bridging module may determine a destination for forwarding the packet based on a layer 2 header of the packet. The bridging module may accordingly make a decision to forward the packet to a destination port or flood the packet to all the ports. The ACL module may perform the function of controlling access to the network coupled to the switch. For example, the ACL module can determine if the packet is allowed to access the network based on certain fields of the packet. The QoS module can provide fairness for access to the resources in the switch as well as the network. For example, the Qos module can limit traffic from a certain port to a certain rate, e.g., by making a decision to drop the packet.

Various packet processing modules that participate in making the decision regarding the packet can provide their respective decisions along with a pre-configured priority to a priority arbiter. The priority arbiter may be configured to perform arbitration based on the priority. For example, in some implementations, a decision associated with the highest priority may be selected. In some instances, the priority may be pre-configured in the priority arbiter. The priority arbiter can consider decisions from all the participating packet processing modules and can make a decision based on the pre-configured priority. For example, the decision can be to drop the packet, forward the packet to another device or to a CPU, or copy to the CPU.

Generally, the priorities used by the priority arbiter to make the decision are configured at the start time, e.g., boot time. However, in some instances, the switch may need to handle different types of packets in the field based on dynamic requirements that may require different assignment of priorities. For example, certain packets or streams may need to be handled in different ways to provide specific, different decisions than what is allowed with the pre-configured priorities. However, once a system is deployed in the field with a set of priorities that can only be programmed at the start time, support for packets or traffic streams requiring specific, different decisions cannot be added to the switch without a re-spin of the switching fabric. For example, re-spin of the switching fabric may include changes in the hardware (e.g., silicon) components of the switching fabric. This can result in unnecessary costs in terms of time and money for the customers.

Various embodiments of the disclosed technologies can allow a programmable switching fabric so that certain packets can be processed in a specific manner based on dynamic requirements. Some embodiments can utilize a programmable way of associating certain reassignment action codes with packets or traffic streams that need to be treated differently. For example, in some implementations, an action code can include an alphanumeric value that can be programmed at a start time or during run time. According to some embodiments, a priority arbiter can allow dynamic reassignment of priorities based on the reassignment action codes associated with the packets. Assigning a certain value to an action code for a packet can allow a certain action to be performed on the packet that may be different than the action that may have been selected based on the pre-configured priority. For example, the action may be based on a decision to drop the packet, mirror the packet, forward the packet, forward the packet to the CPU or copy the packet to the CPU. Note that some embodiments can also support other types of actions which are not discussed in this specification, without deviating from the scope of disclosed technologies.

The switch may include multiple components, e.g., a routing module, a bridging module, an ACL module, a QoS module and any other relevant components. Each of the routing module, bridging module, ACL module and the QoS module can comprise a plurality of packet processors to perform different functionalities. According to some embodiments, a group of related packet processors can be assigned a specific priority range. Each packet processor in each group can process an incoming packet at the same time and can generate a respective processed packet. A packet processor configured to participate in making a decision related to the incoming packet can provide an action, an action code and a priority to a priority arbiter with the processed packet. The priority arbiter can make a decision regarding the packet based on the information provided by the participating packet processors and can provide the decision to a decision processor for performing a selected action.

According to some embodiments, each participating packet processor can determine the priority from a priority range specific to the group the participating packet processor belongs to. In some embodiments, different packet processors associated with different groups can provide different actions and action codes for a specific packet class or traffic stream. The priority arbiter may be configured to process the action codes received from different packet processors and to identify a certain reassignment action code that indicates reassignment of priorities. For example, based on the reassignment action code, the priority arbiter can reassign the priority by inheriting the highest priority from the priority range for the group corresponding to the processed packet. According to the embodiments, the priority arbiter can make the decision regarding the packet based on the action associated with the highest priority. Thus the action generated by the packet processor which inherits the highest priority prevails in forwarding decision of the packet. A selected action can be performed on the packet based on the decision. Hence, associating programmable action codes with the processed packets can allow the selection of specific actions or decisions for specific class of packets based on a dynamic requirement. For example, in order to handle certain packet types or class in the field, appropriate reassignment action codes can be programmed for dynamic path selection of the packet through the switching fabric.

FIG. 1 illustrates a switching device 100 comprising a plurality of components. For example, the switching device 100 may include a priority arbiter 102, a routing module 104, a bridging module 106, an access control list (ACL) module 108 and a quality of service (QoS) module 110. Note that the switching device 100 may include other modules or components which are not shown in FIG. 1 for the purposes of simplicity. Generally, a switching device may receive an incoming packet on one of its ports. The packet can be processed by multiple packet processing modules simultaneously inside the switch. Each packet processing module makes a decision about the packet based on a context and a type of the packet and provides it to a priority arbiter. Typically, the priority arbiter receives decisions along with processed packets from different packet processing modules and makes a decision on the packet based on priorities associated with respective processed packets. Based on the decision the packet may be dropped, forwarded, forwarded to the CPU or copied to the CPU. The switching device may be configured to implement the functionality of a switch, a router, a bridge, a hub or a combination thereof in a computer network environment.

The routing module 104 may process an incoming packet 112 and provide a decision regarding the packet 112 to the priority arbiter 102, e.g., to forward the packet 112, to drop the packet 112, or to copy the packet 112 to the CPU. For example, the packet 112 may be an IP packet or an Ethernet packet. Forwarding the packet 112 may include forwarding to the CPU or to another device (e.g., a computer or a router). The CPU (not shown) may reside on or off the switching device 100 based on the implementation and may be communicatively coupled to the priority arbiter 102. In some instances, the routing module 104 may receive the packet 112 on one of the ports of the switching device 100 and may route the packet 112 to another port. The packet 112 may be destined to another computer connected to the switching device 100 or to another router for routing the packet to a remote network. Generally, the packet 112 may include a header and a payload. For example, the header may include source and destination addresses, a packet length, protocol information, error detection codes and any other suitable information. The routing module 104 may process the header of the incoming packet 112 to determine a routing address based on the source and destination addresses (e.g., IP addresses). In some implementations, the routing module 104 may utilize a routing table that can include routes to particular destinations. For example, the routing table may be in the form of a database implemented in a memory (not shown). Based on various paths available in the routing table, the routing module 104 can determine a port for forwarding the packet 112 to in order to route the packet 112 to a particular destination. The routing module 104 may support IPv4 routing, IPv6 routing or a policy based routing as appropriate.

The bridging module 106 may be configured to perform switching of the packets. In some embodiments, the packets may be Ethernet packets or Ethernet frames. The bridging module 106 may process the packet 112 and provide a decision regarding the packet 112 to the priority arbiter 102. For example, the decision may include forwarding the packet 112, dropping the packet 112 or copying the packet 112 to the CPU. In some instances, the bridging module 106 may process a layer 2 header of the packet 112 and may perform a task of learning the source MAC address into its routing tables. The bridging module 106 may determine if the destination of the packet 112 is known based on the destination address and its routing table. If the destination is known, the bridging module 106 may make a decision to forward the packet 112 to a corresponding port. If the destination is not known, the bridging module 106 may make a decision to flood (or copy) the packet 112 to all the ports. For example, if the packet 112 came in on a port that belongs to a specific virtual local area network (VLAN) in a bridge, the packet 112 may be flooded to all the ports in that VLAN. In some instances, the bridging module 106 may support broadcast functionality associated with layer 2.

The ACL module 108 may process the packet 112 and provide a decision regarding the packet 112 to the priority arbiter 102. For example, the decision may include forwarding the packet 112, dropping the packet 112 or copying the packet 112 to the CPU. In some instances, the ACL module 108 may be configured to control access to a network. For example, the switch 100 may be communicatively coupled to one or more networks (not shown). In some instances, access to a particular network may be allowed or denied based on certain fields of the packet 112. For example, in some instances, certain type of packets or a certain range of IP addresses may or may not be allowed to access certain networks. In some implementations, the ACL module 108 may process the packet 112 in tandem with the QoS module 110 to perform certain functionalities associated with quality of service.

The QoS module 110 may process the packet 112 and provide a decision regarding the packet 112 to the priority arbiter 102. For example, the decision may include forwarding the packet 112, dropping the packet 112 or copying the packet 112 to the CPU. In some instances, the QoS module 110 may provide fairness in terms of access to certain resources in the network as well as inside the switching device 100. For example, in some instances, the QoS module 110 may provide a decision to drop packets to limit traffic from a certain port to a certain rate. The QoS module 110 may determine when the limit is exceeded so that certain packets can be dropped by the QoS module 110 or can be marked to be dropped by other modules along the path through the switching fabric as necessary.

The priority arbiter 102 may be configured to process decisions provided by one or more modules, e.g., the routing module 104, bridging module 106, ACL module 108, QoS module 110, or any other modules, and to make a decision 114 regarding the packet 112 based on a priority associated with the respective decision. In some implementations, the priority arbiter 102 may provide the decision 114 based on which module has higher priority over other modules. The decision 114 may include forwarding the packet, dropping the packet, forwarding the packet to the CPU or copying the packet to the CPU.

The packet 112 may be received on a first port of the switching device 100 and may be forwarded to a second port of the switching device 100. For example, the packet 112 may be destined to another computer connected to the switching device 100 or to a router for routing the packet 112 to a remote network. In some instances, the packet 112 may be copied to the CPU. For example, in some instances, an audit may need to be performed on a traffic stream going from one computer to another computer or the traffic stream may need to be monitored without interrupting the traffic. Copying the packets for that traffic stream to the CPU can allow the software running on the CPU to perform the necessary actions as needed. In some instances, the packet 112 may be dropped based on a policy. For example, the packet 112 may belong to an IP address range that may not be allowed to go through based on a policy associated with the ACL module 108. In some instances, the packet 112 may belong to certain L2 addresses that may not be allowed based on a policy associated with the bridging module 106 and may need to be dropped.

In traditional switches, the priority may be pre-configured for different modules. Generally, the priority arbiter 102 may make the decision 114 regarding the packet 112 based on the pre-configured priorities. For example, the priority may be programmed at a boot time or start time either in the priority arbiter 102 or in the respective modules which process the packet. However, once the initial configuration is performed, the priorities cannot be changed after the switch is deployed in the field. For example, a switch may process different types or class of packets in the field. In some instances it may be desirable to make specific decisions for certain types of packets, which is not supported by the traditional switches that include fixed programmable priorities. For example, it may be determined in the field that a certain packet type should be dropped but the priority arbiter 102 may provide the decision 114 to forward the packet based on the higher priority associated with the module providing the forward decision. The traditional switches may not support changing the priorities once the priorities are programmed. Thus, in order to handle specific types of packets based on a dynamic requirement in the field, a re-spin of the silicon or the hardware may be required resulting in additional time and money.

Some embodiments of the disclosed technologies can utilize certain reassignment action codes for the packets which need to be treated differently. A number of packet processors may be grouped and assigned a specific priority range that can be programmable. Each packet processor in a specific group can be assigned a priority from the corresponding priority range. Each packet processors from a group that is configured to participate in decision making related to an incoming packet can process the packet and can provide a respective action code, an action and the corresponding priority to a priority arbiter with a respective processed packet. The priority arbiter can process the action codes received with the processed packets from various packet processors and can identify the reassignment action code that will be treated differently. In some embodiments, the priority arbiter will inherit highest priority of a certain group of packet processors based on a reassignment action code and will provide a decision including a selected action associated with that reassignment action code.

Figure 2:
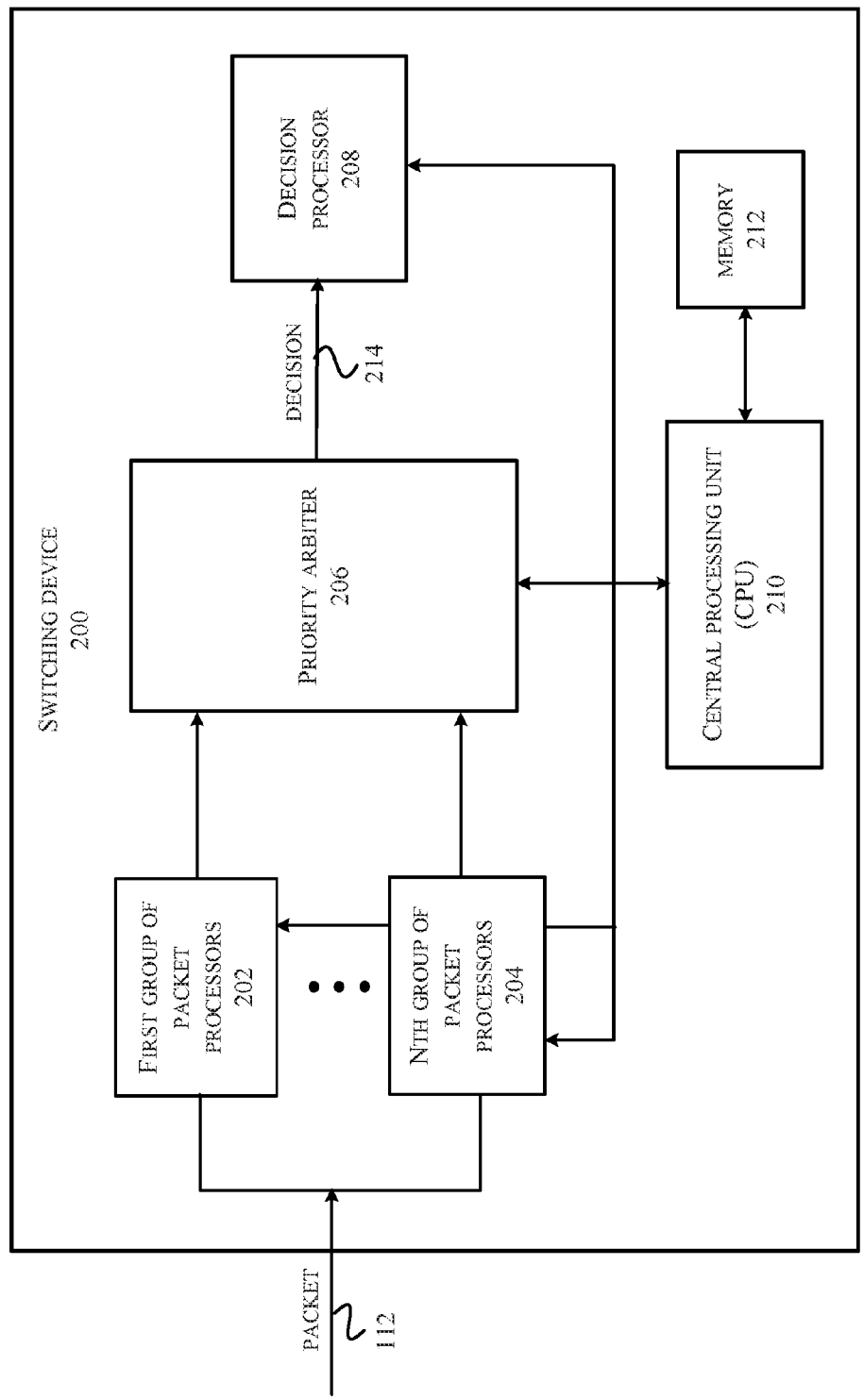
FIG. 2 illustrates a high level diagram of a switching device in one embodiment of the disclosed technologies.

As illustrated in FIG. 2, a switching device 200 may include multiple groups of packet processors, e.g., a first group of packet processors 202 and an Nth group of packet processors 204, a priority arbiter 206, a decision processor 208, a CPU 210 and a memory 212. In one embodiment, the first group of packet processors 202 may include some of the functionality of the routing module 104 and the Nth group of packet processors 204 may include some of the functionality of the bridging module 106, as discussed with reference to FIG. 1. Note that the switching device 200 may include more or less components than shown in FIG. 2 without deviating from the scope of the disclosed technologies.

The CPU 210 may include one or more processing cores that may be configured to execute a plurality of instructions. Some non-limiting examples of the processing cores may include ARM's cortex A57, MIPS, AMD Phenom, Intel ATOM, etc. The instructions may be stored on a computer-readable storage medium, for example, in the form of a computer program. The computer-readable storage medium may be non-transitory. In some instances, the computer readable medium may be part of the memory 212. The memory 212 may be internal or external to the switching device 200. For example, the memory 212 may be a RAM, ROM, Electrically Erasable Programmable Read-Only Memory (EEPROM), flash memory or any suitable storage media. In some embodiments, the memory 212 may also include routing tables associated with the routing module and the bridging module as discussed with reference to FIG. 1.

Each packet processor in the first group of packet processors 202 and the Nth group of packet processors 204 may be configured to process the incoming packet 112 to generate a respective processed packet. For example, different packet processors may process different fields of the incoming packet simultaneously. Each processed packet may include a respective action, an action code and a respective priority from a priority range specific to the corresponding group. A priority range may include a range of numerical values, e.g., 50-100, 41-49, etc. In some embodiments, a higher priority value (e.g., 45) may indicate precedence over a lower priority value (e.g., <=44). An action may include a decision determined by the respective packet processor regarding the packet. For example, some non-limiting examples of the action may include a decision to drop the packet ("drop"), forward the packet ("fwd"), forward the packet to the CPU ("fwd2cpu"), copy the packet to the CPU ("copy2cpu"), etc. In some embodiments, a packet processor may determine a decision based on certain fields of the packet 112 and/or a policy. The policy may include a list of rules that may be provided by a remote server or a host device. Priority may include a numerical value, e.g., 5, 45, 100, etc. An action code may include an alphanumeric value, e.g., 8-bit or 16-bit, that may be used to indicate a specific action associated with that processed packet. In one implementation, the action code may be stored in a register implemented in the memory 212. In some embodiments, a reassignment action code may include a specific value that may indicate reassignment of a priority for a given processed packet. For example, in one implementation, an action code equal to 0x10 may indicate assigning the priority of a processed packet received from a packet processor to a highest priority value (or a maximum value) from the specific priority range associated with that packet processor. In another embodiment, an action code equal to 0x08 may indicate assigning the priority of a processed packet received from a packet processor to a lowest priority value (or a minimum value) from the specific priority range associated with that packet processor.

In some embodiments, the first group of packet processors may include a plurality of packet processors associated with a routing module, a second group of packet processors may include a plurality of packet processors associated with a bridging module, a third group of packet processors may include a plurality of packet processors associated with an ACL module and a fourth group of packet processors may include a plurality of packet processors associated with a QoS module. According to some embodiments, each of the groups may be assigned a respective priority range. For example, the first group may be assigned a first priority range 100-91, the second group may be assigned a second priority range 50-41, the third group may be assigned a third priority range 110-101, and the fourth group may be assigned a fourth priority range 75-70. The priority range may be configured by the CPU 210 or a host coupled to the switching device 200 via a port. In some implementations, priority ranges for the various groups may be stored in the memory 212. Note that not all the packet processors from each group may be configured to make a decision regarding the packet and hence may not provide a corresponding action, action code or priority. For example, in one instance, only one packet processor from a first group, three packet processors from a second group and none from the remaining groups may be configured to make a decision regarding the packet and accordingly may provide a corresponding action, action code and a priority to the priority arbiter 206.

In some embodiments, the plurality of instructions executed by the CPU 210 may include instructions to assign a certain reassignment value to an action code based on certain conditions. For example, the conditions may be detected based on certain fields of the incoming packet and/or based on a policy. The policy may be stored in the memory 212. In some implementations, there may be separate policies for each group of packet processors. For example, there may be a routing policy, a bridging policy, an ACL policy, a QoS policy, etc.

The priority arbiter 206 may be configured to receive the processed packets from multiple packet processors belonging to different groups. Each packet processor from a corresponding group configured to participate in making a decision regarding the packet will provide an action, an action code and a priority from a priority range specific to the group. The priority arbiter 206 may further be configured to process action codes associated with the processed packets for each group. The priority arbiter 206 may reassign priorities associated with zero or more processed packets for each group based on certain action codes associated with respective processed packets. In some embodiments, the priority arbiter 206 may be configured to provide a decision that includes a selected action corresponding to a highest priority value. For example, the priority arbiter 206 may be configured to identify a certain reassignment action code received with a processed packet from a group and to reassign the priority of the processed packet based on the reassignment action code. In some embodiments, reassigning the priority of a processed packet received from a first group may include changing a first priority associated with the processed packet to a second priority from a priority range specific to the first group. For example, the priority arbiter 206 may receive a first action code (e.g., 0x10) from a first packet processor from the first group of packet processors 202 and a second action code (0x02) from a second packet processor from the first group. The priority arbiter 206 may reassign the priority of the processed packet received from the first packet processor to the highest priority of the first group of packet processors 202 if the action code received from the first packet processor is identified to include a specific reassignment value (e.g., 0x10). The priority arbiter 206 may provide a decision 214 including a selected action that is associated with the highest priority. For example, if a first action received from the first packet processor with the first action code includes "drop" and a second action received from the second packet processor includes "fwd2cpu", the decision 214 may include a selected action "drop" since the priority associated with the first action code has been reassigned to include the highest priority value. However, in some instances, if the priority value received from a second group is higher than the reassigned priority value for the first group, the priority arbiter 206 may provide the decision 214 including an action that is associated with the priority value received from the second group. The priority arbiter 206 may be implemented in software, hardware or a combination thereof. In some implementations, the priority arbiter 206 may be implemented as an application specific integrated circuit (ASIC), a field programmable gate array (FPGA) or any suitable circuit.

The decision processor 208 may be configured to perform the selected action associated with the decision 214 provided by the priority arbiter 206. For example, the decision processor 208 may drop the packet, forward the packet to another device, forward the packet to the CPU 210 or copy the packet to the CPU 210. Note that the decision processor 208 may perform other suitable actions within the scope of the disclosed technologies, which are not covered in this specification. The decision processor 208 may include any suitable implementation, e.g., hardware, software or a combination thereof.

Figure 3:
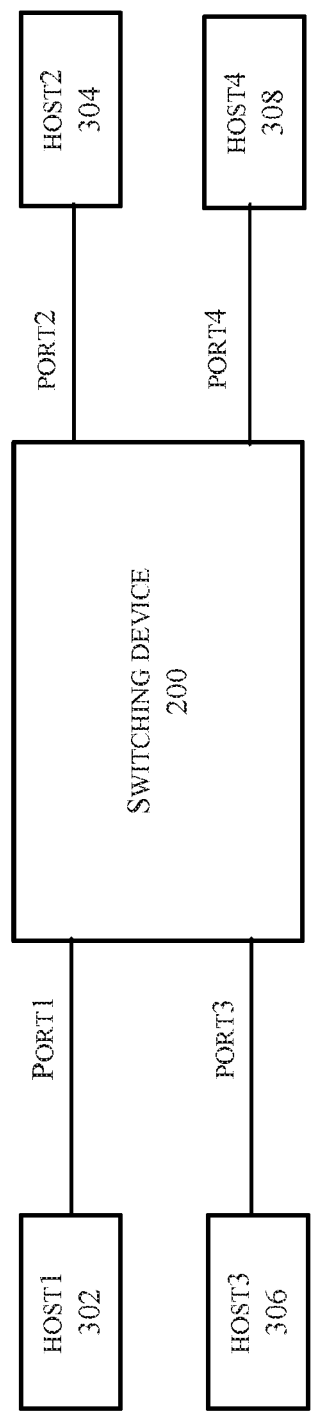
FIG. 3 illustrates the switching device communicatively coupled to multiple hosts, in one embodiment of the disclosed technologies.

The switching device 200 may be used to connect various hosts on one or more networks, as discussed with reference to FIG. 3.

The switching device 200 may be coupled to a host1 302 on port1, a host2 304 on port2, a host3 306 on port3 and a host4 308 on port 4. The host1 302, host2 304, host3 306 and the host4 308 may include various devices, e.g., computers, routers, servers, hubs, switches, etc. in a computer network environment. In some embodiments, the switching device 200 may be communicatively coupled to one or more devices using a special link, also called a trunk. The switching device 200 may be configured to receive ingress packets via one or more ports and to send egress packets via one or more ports.

The switching device 200 may receive a packet on one of its ports from a source device (e.g., a host) for sending it to a destination device (e.g., another host) via another port. In some implementations, the port1, port2, port3 and port4 may be assigned to a single virtual local area network (VLAN) or different VLANs. The switching device 200 may receive the packet 112 on port1 from the host1 302. The packet 112 may be processed through the switching fabric of the switching device 200 and may be dropped or forwarded to one of the ports for sending to the corresponding host based on the decision made by the priority arbiter 206.

Figure 4:
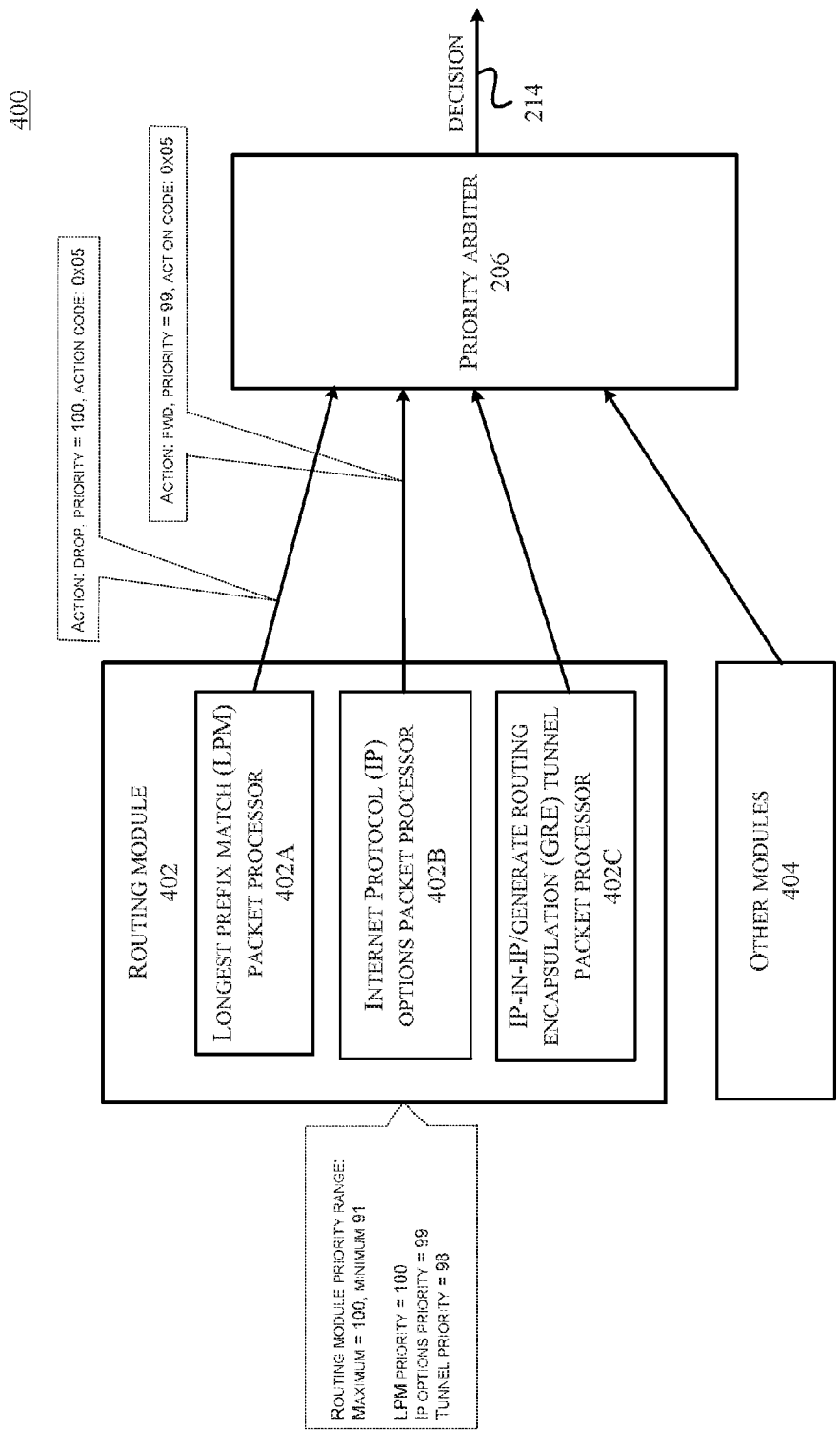
FIG. 4 illustrates a routing module comprising multiple packet processors configured to provide action codes to a priority arbiter, in one embodiment of the disclosed technologies.

A system 400 may be part of the switching device 200. The system 400 may include a routing module 402, other modules 404 and the priority arbiter 206. Note that the other modules 404 may include a bridging module, an ACL module, a QOS module and any other relevant modules, which are not shown in FIG. 4 for the purposes of simplicity. The system 400 may also include a decision processor, as discussed with reference to FIG. 2.

The routing module 402 may include a plurality of packet processors, e.g., a longest prefix match (LPM) packet processor 402A, an IP options packet processor 402B and an IP-in-IP generate routing encapsulation (GRE) tunnel packet processor 402C. The routing module 402 may also include routing tables (not shown) comprising pre-programmed routes. The routing tables may be implemented in a memory which may be part of the memory 212 or may be part of the routing module 402.

The LPM packet processor 402A may be configured to compare IP addresses from the packet header against various length prefixes and may determine a longest matching prefix. The LPM packet processor 402A may generate a decision to forward the packet ("fwd") to an output port specified by the longest matching prefix. If a match is not found in the routing table, the LPM packet processor 402A may generate a decision to drop the packet ("drop"). In one implementation of the routing table, an LPM may be determined using {key, mask} pairs. However, any suitable implementation of the routing tables is possible.

The IP options packet processor 402B may be configured to process IP options included in the packet 112. For example, in some instances, a packet may include optional IP options fields that can provide additional information on how to handle the packet. The IP options fields may include option types, option length and option numbers. The option numbers may include different values for different options, e.g., trace-route, record-route, time-stamp, security classification, source-routes, route-alert, etc. The record-route option may allow recording the route of the packet within the packet header, e.g., by recording an IP address of each device that handles the packet. The time-stamp option may allow recording a time-stamp instead of the IP address. The route-alert option may allow dropping the packet if a route is not found in the routing table.

The IP-in-IP/GRE tunnel packet processor 402C may process an encapsulated packet that may be using the IP-in-IP tunneling or GRE tunneling mechanism. For example, in some embodiments, an IP packet may be encapsulated inside another packet to route other network layer protocols over IP networks. In some implementations, the packet 112 may include an inner IP header and an outer IP header with the payload for IP-in-IP tunneling. In some other implementations, the packet 112 may also include an GRE header for GRE tunneling. The GRE tunnel can support multicast traffic and IPv6 protocol as compared to the IP-in-IP tunnel.

In some embodiments, a routing module priority range may be assigned to the routing module 402 that can include a maximum priority value (e.g., 100) and a minimum priority value (e.g., 91). Each of the packet processors may be assigned a priority within the routing module priority range. For example, an LPM priority value may be assigned a value of 100, an IP option priority value may be assigned a value of 99 and an IP-in-IP/GRE tunnel priority value may be assigned a value of 98.

Each packet processor configured to participate in decision making related to an incoming packet (e.g., the packet 112) can forward a respective action, a priority and a programmable action code to the priority arbiter 206. For example, as illustrated in FIG. 5, in one instance, only the LPM packet processor 402A and the IP options packet processor 402B may be configured to participate in decision making related to a packet. Therefore, the LPM packet processor 402A may forward an action "drop", a priority value of 100 and an action code equal to 0x05 to the priority arbiter 206 and the IP options packet processor 402B may forward an action "fwd", a priority value of 99 and an action code equal to 0x05 to the priority arbiter 206. Note that in this instance, the IP-in-IP/GRE tunnel packet processor 402C may not make a decision about the packet and therefore may not provide a corresponding action code. Typically, the priority arbiter 206 may generate the decision 214 to "drop" the packet based on the highest priority (e.g., 100) associated with the action provided by the LPM packet processor 402A since the action code value of 0x05 may not be a reassignment value and hence may not indicate any reassignment of the priorities.

In some embodiments, for packets belonging to a specific packet class (e.g., an IP packet comprising a record-route IP option), different packet processors in the routing module 402 may generate different actions and action codes. The priority arbiter 206 may be configured to identify a specific reassignment action code forwarded by one of the packet processors and may reassign the priority of that packet processor to the highest priority assigned to the corresponding group. In this instance, the action generated by the packet processor which inherits the highest priority prevails in forwarding the decision of the packet. For example, the priority arbiter 206 may identify a value of 0x10 for a reassignment action code to perform reassignment of the priority to a highest priority of the corresponding group. According to some embodiments, a packet processor can program its corresponding action code to 0x10 so that the action provided by the packet processor prevails in generating the decision 214 by the priority arbiter 206. This is further explained using a table in FIG. 5.

FIG. 5 illustrates a table 500 showing reassignment of priorities based on the reassignment action code, according to some embodiments of the disclosed technologies.

As illustrated in the table 500, a packet processor 502 can provide a processed packet with an action code 504 and a normal priority 506 to the priority arbiter 206. For a typical switch, an action generated by the packet processor 502 with the highest priority would generally prevail. For example, as illustrated in the table 500, the normal priority 506 for the LPM packet processor 402A (e.g., 100) is higher than the IP options packet processor 402B (e.g., 99) and the IP-in-IP/GRE tunnel packet processor 402C (e.g., 98), therefore, an action generated by the LPM packet processor 402A may prevail. Thus, referring back to FIG. 4, the action (e.g., "drop") generated by the LPM packet processor 402A will get priority over the action (e.g., "fwd") generated by the IP options packet processor 402B and hence the decision 114 generated by a typical priority arbiter (e.g., the priority arbiter 102 as discussed with reference to FIG. 1) may be to drop the packet.

However, according to some embodiments of the disclosed technologies, the priority arbiter 206 can generate a final priority 508 based on the action code 504 provided by the packet processor 502. In some embodiments, the priority arbiter 206 may reassign the priority of a packet processor based on a specific reassignment action code generated by that packet processor so that an action generated by that packet processor prevails in making the decision by the priority arbiter 206. For example, the packet may include a specific IP option (e.g., IP record-route) that needs to be handled in a certain way that the decision made by the IP options packet processor 402B prevails. Hence, according to some embodiments, the action code 504 provided by the IP options packet processor 402B can be assigned a specific reassignment value (e.g., 0x10) to allow the priority arbiter 206 to reassign the priority of the IP options packet processor 402B to the highest priority of the routing module 402. The priority arbiter 206 may be configured to identify the specific reassignment value of 0x10 for the action code 504 provided by the IP options packet processor 402B and can swap the priority of the IP options packet processor 402B with the priority of the LPM packet processor 402A (e.g., with the highest priority value of 100). Therefore the final priority 508 may be 100 for the IP options packet processor 402B and 99 for the LPM packet processor 402. Thus, the priority arbiter 206 may give priority to the action provided by the IP options packet processor 402B over other packet processors in the corresponding group and may generate the decision 214 including a selected action provided by the IP options packet processor 402B. Note that the IP-in-IP/GRE tunnel packet processor 402C provides a NOP for the action code 504 and hence its priority remains unchanged.

In another example, the packet may include a route-alert IP option. The LPM packet processor 402 may be configured to make a decision to "drop" the packet if a route is not found in its routing table. According to some embodiments, the IP options packet processor 402B may be configured to generate a specific reassignment action code (e.g., 0x10) and a "fwd2cpu" action for the route-alert IP option so that the packet can be forwarded to the CPU instead of dropping the packet. The priority arbiter 206 may receive the action codes and the actions from the respective packet processors and may reassign the priority of the IP options packet processor 402B to the highest priority (e.g., 100) assigned to the routing module 402. Thus, the decision 214 made by the priority arbiter 206 may include a selected action "fwd2cpu" and the packet including the specific route-alert IP option can be forwarded to the CPU 210 by the decision processor 208.

A system 600 may be part of the switching device 200. The system 600 may include a bridging module 602, other modules 604 and the priority arbiter 206. Note that the other modules 604 may include a routing module, an ACL module, a QOS module and any other relevant modules, which are not shown in FIG. 6 for the purposes of simplicity. The system 600 may also include a decision processor, as discussed with reference to FIG. 2.

The bridging module 602 may include a layer 2 forwarding (L2 fwd) packet processor 602A, a layer 2 learning (L2 learn) packet processor 602B, a virtual LAN (VLAN) packet processor 602C, a trunking packet processor 602D and a port-VLAN packet processor 602E. The L2 fwd packet processor 602A, L2 learn packet processor 602B, VLAN packet processor 602C, trunking packet processor 602D and the port-VLAN packet processor 602E may process the incoming packet simultaneously and can generate processed packets including a respective action for the packet.

Generally, the L2 fwd packet processor 602A may be configured to determine if a destination L2-address (e.g., source MAC address) of an incoming packet is known then it forwards the packet to the port where the destination address is located. If the source L2-address (e.g., source MAC-address) of the incoming packet is not known, the address may be learned by the L2 learn packet processor 602B so that if any packets arrive with this source as their destination, they can be forwarded to the port on which this packet just arrived. In the scenario when destination MAC of a packet is known but source is still unknown, then default behavior of the bridging module 602 may be to forward the packet to the destination and in parallel, process the packet in the L2 learn packet processor 602B to learn the source. In one implementation, forwarding and learning tables for the bridging module 602 may be implemented in the memory 212.

The VLAN packet processor 602C may be configured to process packets belonging to a specific VLAN and perform certain actions, e.g., membership verification, flooding of packets for unknown destination addresses, or learning of unknown addresses, etc. For example, one or more ports of the switching device 200 may be assigned to a VLAN. A device (e.g., the host1 302) sending a packet to the switching device 200 may be a member of the VLAN based on the physical port (e.g., port1) to which the device is connected. In some implementations, VLAN membership may be stored in a database, e.g., in the memory 212.

The trunking packet processor 602D may be configured to process the packets to enable certain packets that belong to multiple VLANs to ingress or egress a trunk to carry traffic for multiple VLANs. The trunking packet processor 602D may also be configured to check membership of the packets before enabling them to travel over the trunks.

The port-VLAN packet processor 602E may be configured to maintain port-to-VLAN membership. The port-VLAN packet processor 602E may further be configured for checking membership information for an ingress packet on a port and to assign VLAN to ingress packets, etc.

Figure 6:
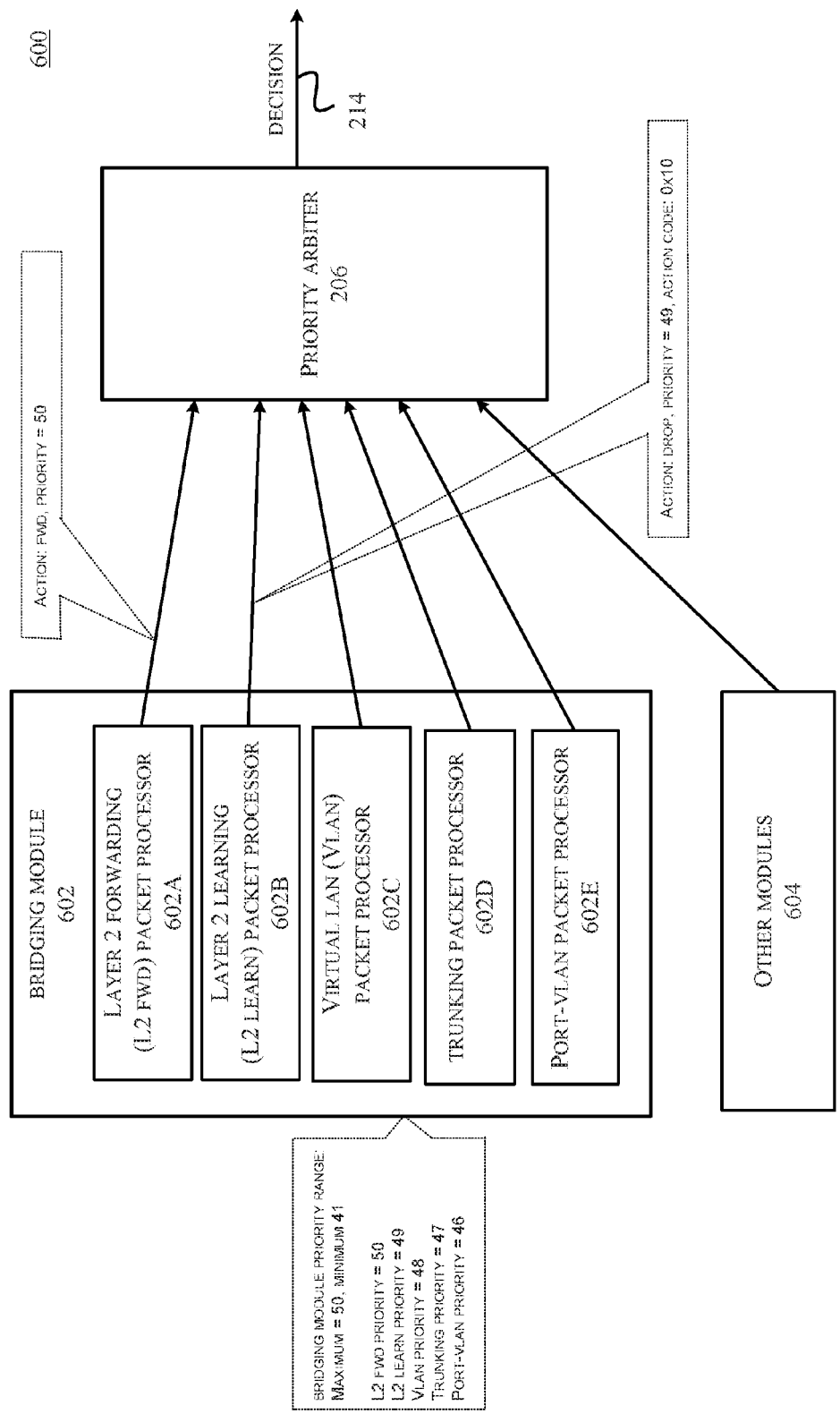
FIG. 6 illustrates a bridging module comprising multiple packet processors configured to provide action codes to the priority arbiter, in one embodiment of the disclosed technologies.

In some embodiments, a bridging module priority range may be assigned to the bridging module 602 that can include a maximum priority value (e.g., 50) and a minimum priority value (e.g., 41). Each of the packet processors may be assigned a priority within the bridging module priority range. For example, an L2 fwd priority value may be assigned a value of 50, an L2 learn priority value may be assigned a value of 49, a VLAN priority value may be assigned a value of 48, a trunking priority value may be assigned a value of 47 and a port-VLAN priority value may be assigned a value of 46. As illustrated in FIG. 6, the L2 fwd packet processor 602A may provide a processed packet including an action equal to "fwd" and a priority value of 50 to the priority arbiter 206. The L2 learn packet processor 602B may provide a processed packet including an action equal to "drop" and a priority value of 49 to the priority arbiter 206. Since the priority provided by the L2 fwd packet processor 602A (e.g., 50) is higher than the L2 learn packet processor 602B (e.g., 49), typically an action generated by the L2 learn packet processor 602B. Thus, the action (e.g., "fwd") generated by the L2 fwd packet processor 602A will get priority over the action (e.g., "drop") generated by the L2 learn packet processor 602B and hence the decision 114 generated by a typical priority arbiter (e.g., the priority arbiter 102 as discussed with reference to FIG. 1) may be to forward the packet.

In certain instances, it may be desirable in the field that the layer-2 packets are not to be forwarded unless their source address has been learned. Hence, for the switches deployed in the field with this specific requirement, according to the embodiments, the L2 learn packet processor 602B can be programmed to forward specific reassignment action code (e.g., 0x10) along with its action of "drop" to the priority arbiter 206. The priority arbiter 206 can process the action code 0x10 received from the L2 learn packet processor 602B and can reassign the priority of the L2 learn packet processor 602B to the highest priority from the bridging module priority range (e.g., 50). Thus the action associated with the L2 learn packet processor 602B (e.g., "drop") can prevail over the action associated with the L2 fwd packet processor 602A (e.g., "fwd") in this specific instance. The decision processor 208 can drop the packet based on the selected action "drop" provided by the priority arbiter 206 in the decision 214. Note that in this instance, the VLAN packet processor 602C, trunking packet processor 602D and the port-VLAN packet processor 602E do not participate in making the decision about the packet and hence do not provide a corresponding action code.

Figure 7:
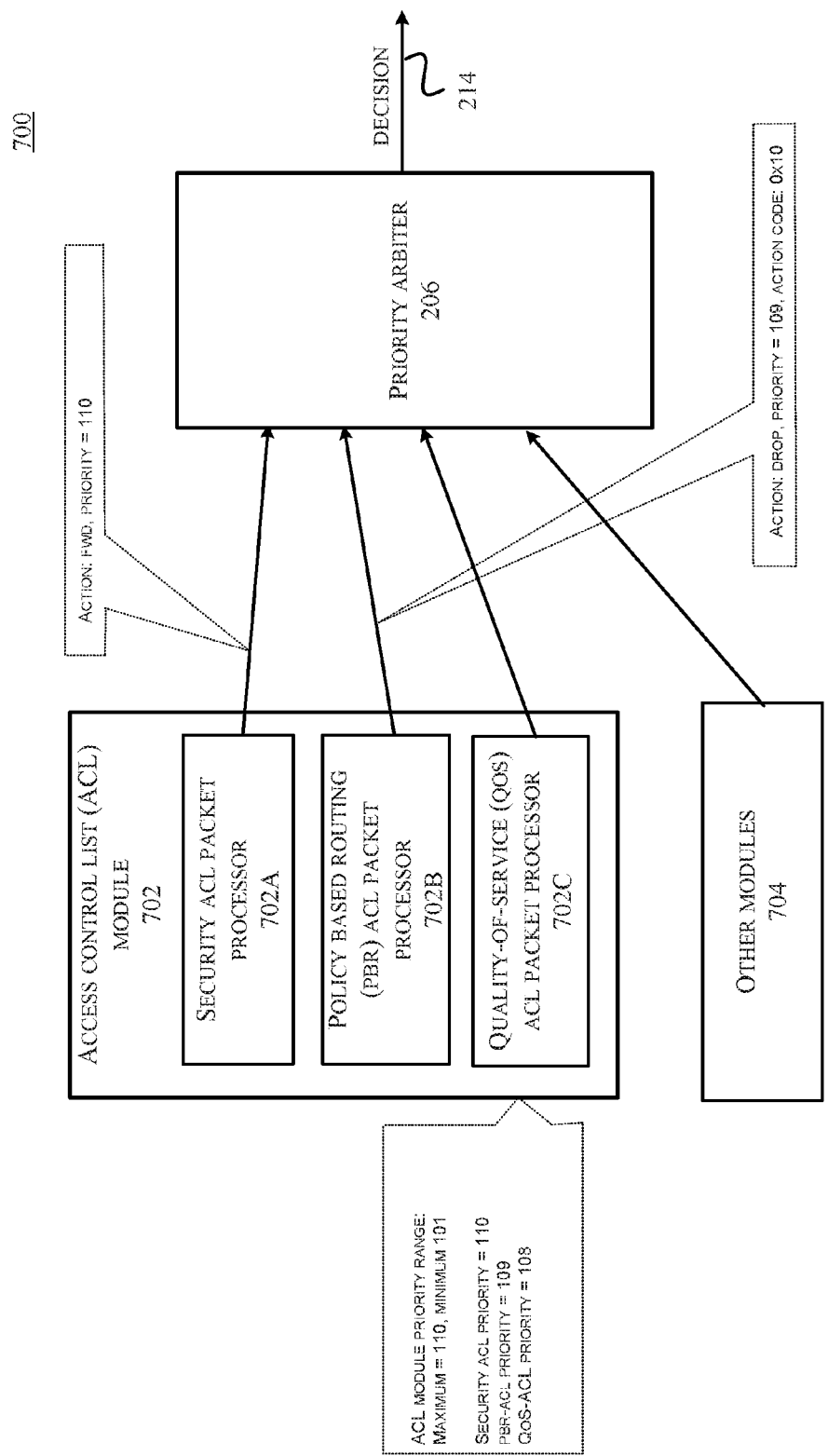
FIG. 7 illustrates an access control list (ACL) module comprising multiple packet processors configured to provide action codes to the priority arbiter, in one embodiment of the disclosed technologies.

A system 700 may be part of the switching device 200. The system 700 may include ACL module 702, other modules 704 and the priority arbiter 206. Note that the other modules 704 may include a routing module, a bridging module, a QOS module and any other relevant modules, which are not shown in FIG. 7 for the purposes of simplicity.

The ACL module 602 may include a security ACL packet processor 702A, a policy based routing (PBR) ACL packet processor 702B and a quality-of-service (QOS) ACL packet processor 702C. The security ACL packet processor 702A, policy based routing (PBR) ACL packet processor 702B and the quality-of-service (QOS) ACL packet processor 702C may process the incoming packet simultaneously and can generate processed packets including a respective action for the packet.

The security ACL packet processor 702A may be configured to enforce security rules for the switching device 200 and the network. In most instances, the security ACL packet processor 702A may include the highest priority and therefore an action generated by the security ACL packet processor 702A may prevail for the ACL module 702.

The PBR ACL packet processor 702B may be configured as a helper in implementing policy based routing assisted by the ACL module 702.

The QOS ACL packet processor 702C may be configured to examine a packet and may recommend specific treatment in terms of class of service provided to a packet, as well as may generate "drop". "fwd", or "fwd2cpu" action.

In some embodiments, an ACL module priority range may be assigned to the ACL module 702 that can include a maximum priority value (e.g., 110) and a minimum priority value (e.g., 101). Each of the packet processors may be assigned a priority within the ACL module priority range. For example, a security ACL priority value may be assigned a value of 110, PBR ACL priority value may be assigned a value of 109, and a QoS-ACL priority value may be assigned a value of 108.

In some instances, the security ACL packet processor 702A may be configured to drop all packets to a specific destination inside a protected and secured part of the network. The PBR ACL packet processor 702B can send a specific reassignment action code (e.g., 0x10) to the priority arbiter 206 along with "fwd" action for matching packets based on certain rules. Note that the same packet may also be processed by the security ACL packet processor 702A which may generate the "drop" action. But since the PBR ACL packet processor 702B sends the specific reassignment action code (0x10) to the priority arbiter 206), the PBR ACL packet processor 702B inherits the highest priority. Therefore, the action "fwd" provided by the PBR ACL packet processor 702B prevails over the "drop" action provided by the security ACL packet processor 702A. The decision processor 208 can forward the packet based on the selected action "fwd" provided by the priority arbiter 206 in the decision 214.

In some embodiments, an integrated circuit 800 may be used to implemented the functionality of the priority arbiter 206. The integrated circuit 800 may be an ASIC, an FPGA or any suitable circuit.

Figure 8:
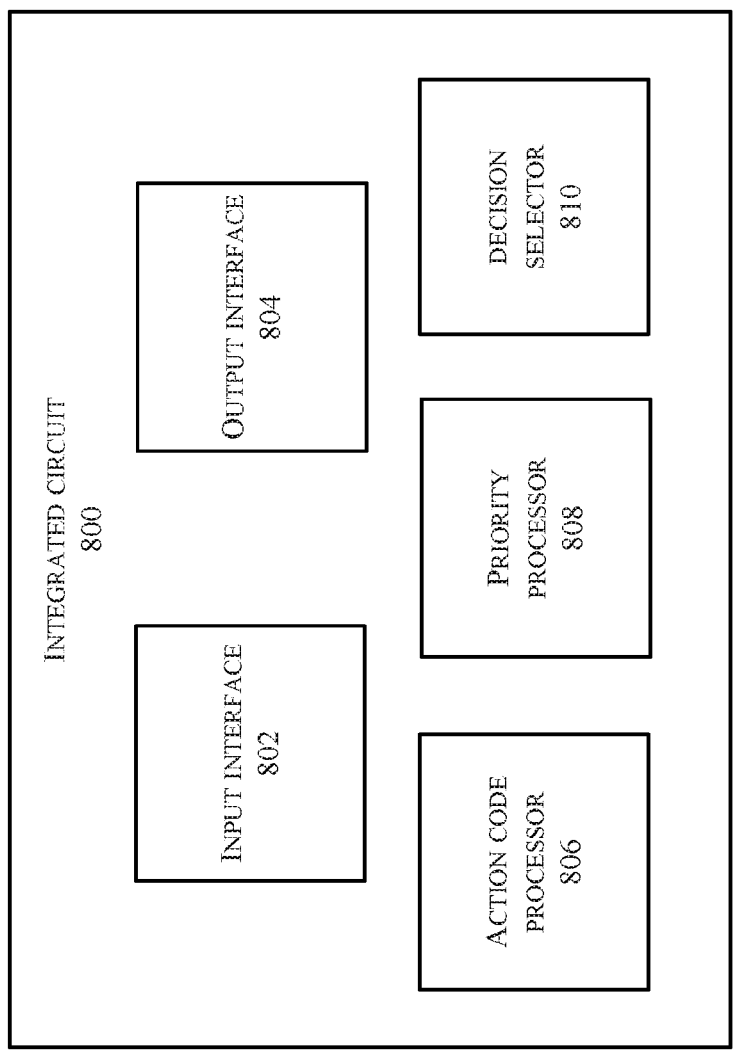
FIG. 8 illustrates components of an integrated circuit, according to some embodiments of the disclosed technologies.

The integrated circuit 800 may include an input interface 802, an output interface 804, an action code processor 806, a priority processor 808 and a decision selector 810. It will be understood that the integrated circuit 800 may include more or less components than shown in FIG. 8, without deviating from the scope of the disclosed technologies.

The input interface 802 may be configured to interface with various groups of packet processors. For example, the integrated circuit 800 may utilize the input interface 802 to interface with the routing module 402 comprising a first group of packet processors, the bridging module 602 comprising a second group of packet processors and the ACL module 702 comprising a third group of packet processors. The integrated circuit 800 may be configured to receive actions, action codes and priorities from different packet processors in various groups.

The output interface 804 may be configured to interface with the decision processor 208 as discussed with reference to FIG. 2. For example, the integrated circuit 800 may utilize the output interface 804 to provide the decision related to the processed packet to the decision processor 208. The decision processor 208 can drop the packet, forward the packet to the CPU, copy the packet to the CPU or forward the packet to another device based on a selected action in the decision 214.

The action code processor 806 may be configured to process the action codes provided by different pocket processors from various groups. For example, the action codes may be received via the input interface 802. According to some embodiments, the action codes may be used by the integrated circuit 800 to handle some of packets in a specific manner. The action code processor 806 may process the action codes to perform certain actions based on certain specific reassignment values of the action codes. For example, as discussed with reference to FIGS. 4-7, the action code processor 806 may identify the reassignment action code value of 0x10 to perform reassignment of the priorities associated with the respective packet processors from a group.

The priority processor 808 may be configured to reassign priorities provided by the respective packet processors based on the corresponding action codes. For example, the action code processor 806 may identify certain reassignment action codes that may indicate that the priority associated with the corresponding action code may need to be reassigned to the highest priority from the corresponding priority range, as discussed with reference to FIGS. 4-7 using the action code 0x10.

The decision selector 810 may be configured to generate the decision 214 including a selected action associated with the packet processor with the highest priority. The decision 214 may be forwarded to the decision processor 208 via the output interface 804 to perform the selected action. The decision processor 208 can perform the selected action to drop the packet, forward the packet to the CPU, copy the packet to the CPU or forward the packet to another device based on the decision 214.

Figure 9:
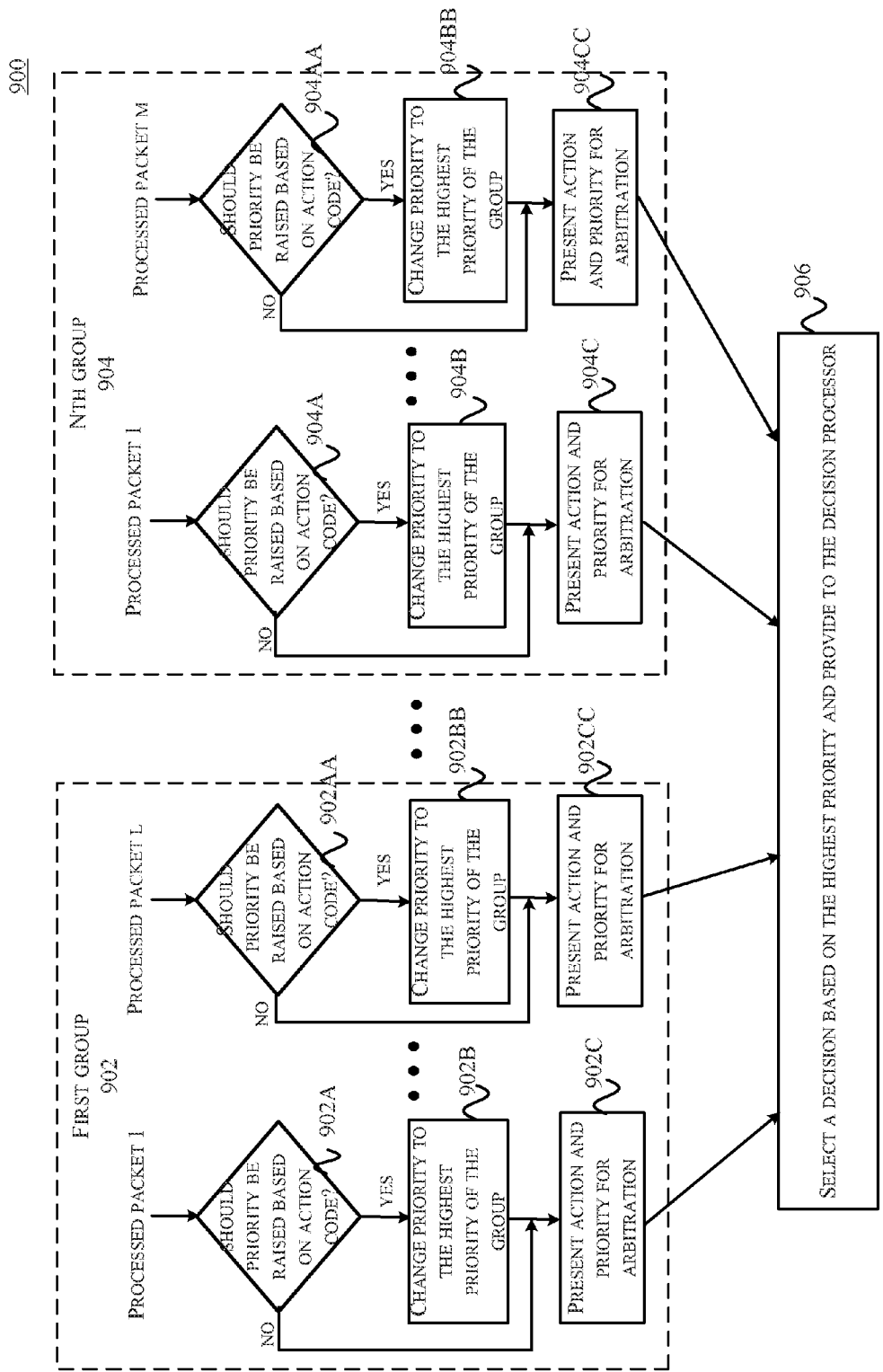
FIG. 9 illustrates a method performed by the priority arbiter to generate a decision based on the action code, in some embodiments of the disclosed technologies.

FIG. 9 illustrates a method performed by the priority arbiter to generate a decision based on the action code, in some embodiments of the disclosed technologies. For example, the priority arbiter may be implemented as the integrated circuit 800, as discussed with reference to FIG. 8. The priority arbiter 206 may receive processed packets 1-L from a first group 902 and processed packets 1-M from an Nth group 904. For example, the priority arbiter 206 may receive a processed packet including an action, an action code and a priority from the respective packet processor in each group. In one embodiment, the routing module 402 may include the first group 902 and the bridging module 602 may include the Nth group 904. The processed packets 1-L may be provided by various packet processors from the routing module 402 which are configured to participate in making a decision about an incoming packet and the processed packets 1-M may be provided by various packet processors from the bridging module 602 which are configured to participate in making a decision about the incoming packet. The priority arbiter 206 may make a decision based on the action code and provide the decision including a selected action to the decision processor 208.

In steps 902A, 902AA, 904A and 904AA, the priority arbiter 206 may determine if the priority should be raised based on the action code. Referring back to FIG. 8, the priority arbiter 206 may receive an action, an action code and a priority from the respective packet processor in a corresponding group via the input interface 802. The action code processor 806 may process the action code included in the processed packets 1-L and the processed packets 1-M to identify certain reassignment action codes that may require raising the priority. If the priority needs to be changed based on the action codes, the priority can be changed in the steps 902B, 902BB, 904B or 904BB. If the priority does not need to be changed based on the action codes, the priority arbiter 206 executes steps 902C, 902CC, 904C and 904CC.

In steps 902B, 902BB, 904B and 904BB, the priority arbiter 206 may change the priority to the highest priority of the group based on the corresponding reassignment action code. Referring back to FIG. 8, the priority processor 808 may assign the priority to the highest priority from the specific priority range of the corresponding group. As discussed with reference to FIGS. 4, 6 and 7, the priority arbiter 206 identifies the reassignment action code 0x10 and changes the priority to give precedence to the corresponding action.

In steps 902C, 902CC, 904C and 904CC, the action and priority for each processed packet may be presented for arbitration. Referring back to FIG. 8, the priority processor 808 may provide the reassigned or the original priority for each processed packet for each group to the decision selector 810.

In step 906, the priority arbiter 206 may determine a decision based on the highest priority and provide to the decision processor 208. Referring back to FIG. 8, the decision selector 810 may generate a decision including a selected action associated with the highest priority. As discussed with reference to FIGS. 4, 6 and 7, the priority arbiter 206 can generate the decision 214 based on the highest priority that was reassigned based on a certain reassignment action code (e.g., 0x10) or the highest priority that was provided by a packet processor.

Various embodiments of the disclosed technologies can allow reassignment of priorities to allow certain actions to prevail for specific types or class of packets. For example, as discussed with reference to FIGS. 2-8, programmable action codes can be associated with corresponding decisions from different packet processors. In accordance with some embodiments, a priority arbiter can reassign the priorities associated with certain processed packets based on certain reassignment action codes. For example, the priority associated with an action can be reassigned to a highest value from a corresponding priority range and hence the action associated with the highest priority takes precedence in making the decision about the packet. Thus, embodiments of the disclosed technologies can provide flexibility in handling certain types of packets in the field by utilizing programmable action codes and without requiring hardware changes.

Figure 10:
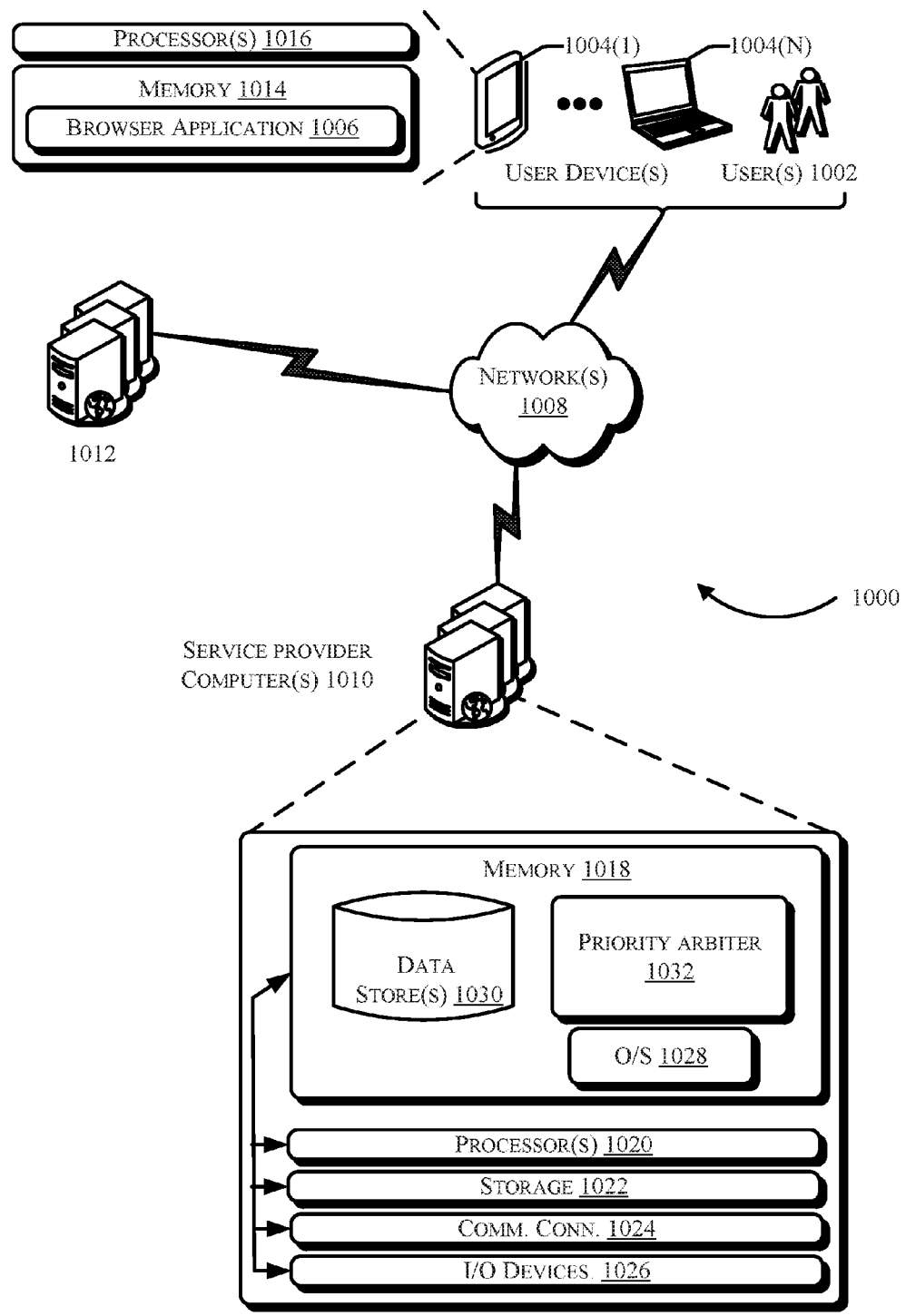
FIG. 10 illustrates an exemplary architecture for features and systems described herein that includes one or more service provider computers and/or a user device connected via one or more networks, according to at least one exemplary embodiment.

FIG. 10 illustrates an exemplary architecture for features and systems described herein that includes one or more service provider computers and/or a user device connected via one or more networks, according to at least one exemplary embodiment. The devices discussed in FIGS. 4-5, may use one or more components of the computing devices described in FIG. 10 or may represent one or more computing devices described in FIG. 10. In architecture 1000, one or more users 1002 may utilize user computing devices 1004(1)-(N) (collectively, user devices 1004) to access application 1006 (e.g., a web browser or mobile device application), via one or more networks 1008. In some aspects, application 1006 may be hosted, managed and/or provided by a computing resources service or service provider. One or more service provider computers 1010 may provide a native application which is configured to run on user devices 1004 which user(s) 1002 may interact with. Service provider computer(s) 1010 may, in some examples, provide computing resources such as, but not limited to, client entities, low latency data storage, durable data storage, data access, management, virtualization, cloud-based software solutions, electronic content performance management, etc. Service provider computer(s) 1010 may also be operable to provide web hosting, computer application development and/or implementation platforms, combinations of the foregoing or the like to user(s) 1002. Service provider computer(s) 1010, in some examples, may communicate with one or more third party computers 1012.

In some examples, network(s) 1008 may include any one or a combination of many different types of networks, such as cable networks, the Internet, wireless networks, cellular networks and other private and/or public networks. While the illustrated example represents user(s) 1002 accessing application 1006 over network(s) 1008, the described techniques may equally apply in instances where user(s) 1002 interact with service provider computer(s) 1010 via user device(s) 1004 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1006 may allow user(s) 1002 to interact with service provider computer(s) 1010 such as to access web content (e.g., web pages, music, video, etc.). Service provider computer(s) 1010, perhaps arranged in a cluster of servers or as a server farm, may host application 1006 and/or cloud-based software services. Other server architectures may also be used to host application 1006. Application 1006 may be capable of handling requests from many users 1002 and serving, in response, various item web pages. Application 1006 can provide any type of website that supports user interaction, including social networking sites, online retailers, informational sites, blog sites, search engine sites, news and entertainment sites and so forth. As discussed above, the described techniques can similarly be implemented outside of application 1006, such as with other applications running on user device(s) 1404.

User device(s) 1004 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1004 may be in communication with service provider computer(s) 1010 via network(s) 1008, or via other network connections. Additionally, user device(s) 1004 may be part of the distributed system managed by, controlled by or otherwise part of service provider computer(s) 1010 (e.g., a console device integrated with service provider computers 1010).

In one illustrative configuration, user device(s) 1004 may include at least one memory 1014 and one or more processing units (or processor(s)) 1016. Processor(s) 1016 may be implemented as appropriate in hardware, computer-executable instructions, firmware, or combinations thereof. Computer-executable instruction or firmware implementations of processor(s) 1016 may include computer-executable or machine-executable instructions written in any suitable programming language to perform the various functions described. User device(s) 1004 may also include geo-location devices (e.g., a global positioning system (GPS) device or the like) for providing and/or recording geographic location information associated with user device(s) 1004.

Memory 1014 may store program instructions that are loadable and executable on processor(s) 1016, as well as data generated during the execution of these programs. Depending on the configuration and type of user device(s) 1004, memory 1014 may be volatile (such as random access memory (RAM)) and/or non-volatile (such as read-only memory (ROM), flash memory, etc.). User device(s) 1004 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1014 may include multiple different types of memory, such as static random access memory (SRAM), dynamic random access memory (DRAM), or ROM.

Turning to the contents of memory 1014 in more detail, memory 1014 may include an operating system and one or more application programs or services for implementing the features disclosed herein including at least a user provided input element or electronic service web page, such as via browser application 1006 or dedicated applications (e.g., smart phone applications, tablet applications, etc.). Browser application 1006 may be configured to receive, store and/or display a website or other interface for interacting with service provider computer(s) 1010. Additionally, memory 1014 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1004.

In some aspects, service provider computer(s) 1010 may also be any type of computing devices such as, but not limited to, a mobile phone, a smart phone, a personal digital assistant (PDA), a laptop computer, a desktop computer, a server computer, a network switch, a thin-client device, a tablet PC, etc. Additionally, it should be noted that in some embodiments, service provider computer(s) 1010 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1010 may be in communication with user device(s) 1004 and/or other service providers via network(s) 1008, or via other network connections. Service provider computer(s) 1010 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1010 may include at least one memory 1018 and one or more processing units (or processor(s)) 1020. Processor(s) 1020 may be implemented as appropriate in hardware, computer-executable instructions, firmware or combinations thereof. Computer-executable instruction or firmware implementations of processor(s) 1020 may include computer-executable or machine-executable instructions written in any suitable programming language to perform the various functions described.

In some instances, hardware processor(s) 1020 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1018 may store program instructions that are loadable and executable on processor(s) 1020, as well as data generated during the execution of these programs. Depending on the configuration and type of service provider computer(s) 1010, memory 1018 may be volatile (such as RAM) and/or non-volatile (such as ROM, flash memory, etc.). Service provider computer(s) 1010 or servers may also include additional storage 1022, which may include removable storage and/or non-removable storage. The additional storage 1022 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1018 may include multiple different types of memory, such as SRAM, DRAM, or ROM.

Memory 1018, the additional storage 1022, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1018 and the additional storage 1022 are all examples of computer storage media. Additional types of computer storage media that may be present in service provider computer(s) 1010 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1010. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1010 may also contain communications connection(s) 1024 that allow service provider computer(s) 1010 to communicate with a stored database, another computing device or server, user terminals and/or other devices on network(s) 1008. Service provider computer(s) 1010 may also include I/O device(s) 1026, e.g., a keyboard, a mouse, a pen, a voice input device, a touch input device, a display, speakers, a printer, etc.

Memory 1018 may include an operating system 1028, one or more data stores 1030 and/or one or more application programs or services for implementing the features disclosed herein. In some implementations, the memory 1018 may include a priority arbiter 1032. The priority arbiter 1032 may be similar to the priority arbiter 206 as described with reference to FIG. 2. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, and/or functions described herein can be provided by one or more modules that exist as separate modules and/or module functions described herein can be spread over multiple modules.

Figure 11:
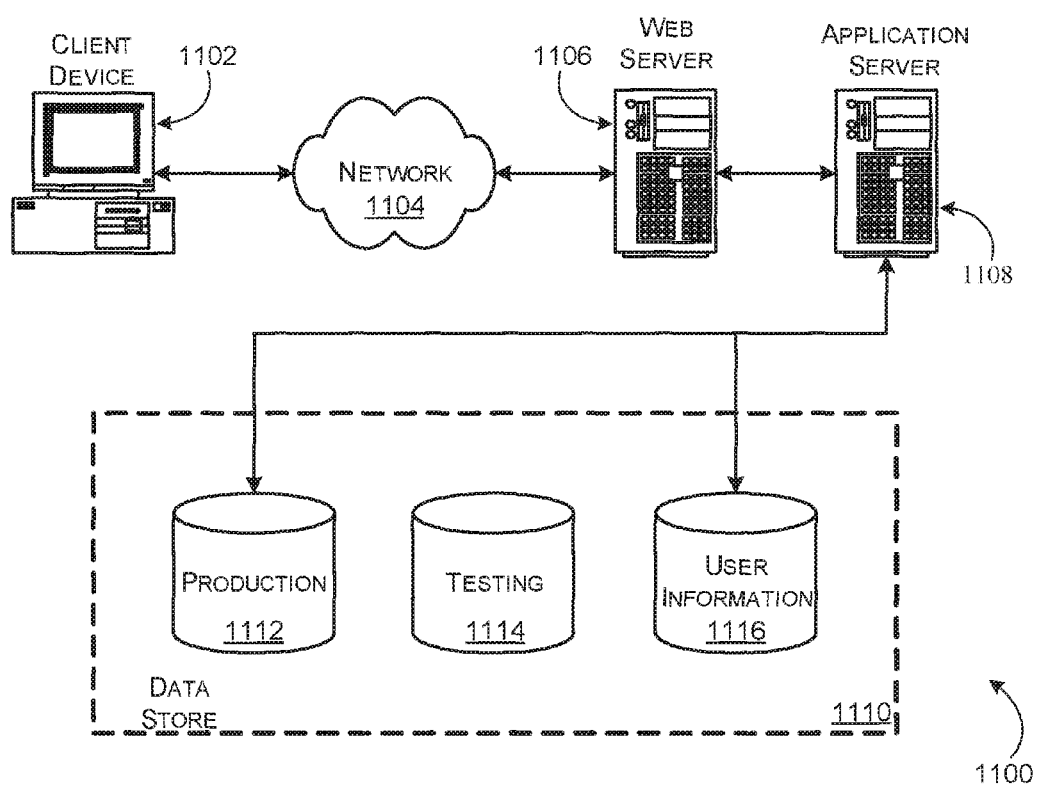
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1100. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those various embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A switching device comprising:
a routing module comprising a first group of packet processors, wherein each packet processor in the first group is configured to process an incoming packet to generate a respective processed packet, wherein each processed packet includes a respective action, a respective action code and a respective priority associated with the respective action from a first priority range;

a bridging module comprising a second group of packet processors, wherein each packet processor in the second group is configured to process the incoming packet to generate a respective processed packet, wherein each processed packet includes a respective action, a respective action code and a respective priority associated with the respective action from a second priority range; and a priority arbiter communicatively coupled to the routing module and to the bridging module, the priority arbiter configured to:
receive the processed packets from the routing module and the bridging module;
process the action codes associated with the processed packets;
reassign the priority associated with the respective action for a given processed packet based on a certain action code in the given processed packet, the certain action code indicating reassignment of the priority associated with the respective action for the given processed packet; and
select an action associated with a highest priority from the actions for the processed packets to perform on the incoming packet.

2. The switching device of claim 1, wherein reassigning the priority includes changing the priority to a highest priority value of a corresponding priority range.

3. The switching device of claim 1, further comprising a decision processor configured to perform the selected action on the incoming packet.

4. The switching device of claim 1, further comprising an access control list (ACL) module comprising a third group of packet processors, wherein each packet processor in the third group is configured to process the incoming packet to generate a respective processed packet, wherein each processed packet includes a respective action, a respective action code and a respective priority associated with the respective action from a third priority range.

5. An integrated circuit comprising:
an input interface configured to receive processed packets from groups of packet processors, wherein each packet processor is configured to process an incoming packet to generate a respective processed packet, and wherein each processed packet includes an action, an action code and a priority associated with the action from a specific priority range associated with a group of packet processors that processed the packet;
an action code processor configured to process the action codes of the processed packets to identify a reassignment action code that indicates reassignment of the priority associated with the action for the respective processed packet;
a priority processor configured to reassign the priority associated with the action within the specific priority range for a given processed packet based on the reassignment action code;
a decision selector configured to select a decision based on a highest priority; and
an output interface configured to provide the decision to a decision processor for performing a selected action associated with the highest priority on the incoming packet.

6. The integrated circuit of claim 5, wherein the action includes "forward", "forward to a central processing unit (CPU)", "copy to the CPU" or "drop".

7. The integrated circuit of claim 5, wherein the decision includes "forward", "forward to a central processing unit (CPU)", "copy to the CPU" or "drop".

8. The integrated circuit of claim 5, wherein the groups include a first group, wherein the first group corresponds to a routing module and wherein the packet processors include a longest prefix match (LPM) packet processor, and an IP-in-IP/generate routing encapsulation (GRE) tunnel packet processor.

9. The integrated circuit of claim 8, wherein the groups include a second group, wherein the second group corresponds to a bridging module and wherein the packet processors include a layer-2 forwarding packet processor, a layer-2 learning packet processor, a virtual local area network (VLAN) packet processor, a trunking packet processor and a port-VLAN packet processor.

10. The integrated circuit of claim 9, wherein the groups include a third group, wherein the third group corresponds to an access control list (ACL) module and wherein the packet processors include a security ACL packet processor, a policy based routing ACL packet processor and a quality-of-service (QOS) ACL packet processor.

11. The integrated circuit of claim 5, wherein the reassignment of the priority includes changing the priority to a highest priority value of a corresponding priority range.

12. The integrated circuit of claim 5, wherein the reassignment action code is assigned based on a policy associated with the respective group.

13. The integrated circuit of claim 5, wherein the incoming packet includes a plurality of fields and wherein the reassignment action code is assigned based on one of the fields of the incoming packet.

14. The integrated circuit of claim 13, wherein the incoming packet is an IP packet and the one of the fields is associated with IP options.

15. The integrated circuit of claim 5, wherein the incoming packet is a layer 2 (L2) packet.

16. The integrated circuit of claim 5, wherein the integrated circuit implements functionality of a priority arbiter and wherein the priority arbiter is part of a switching device.

17. The integrated circuit of claim 5, wherein the integrated circuit is an application specific integrated circuit (ASIC) or a field programmable gate array (FPGA).

18. A method comprising:
receiving, by a priority arbiter, processed packets from groups of packet processors, wherein each packet processor is configured to process an incoming packet to generate a respective processed packet, and wherein each processed packet includes an action, an action code and a priority associated with the action from a specific priority range associated with a group of packet processors that processed the packet;
processing action codes of the respective processed packets to identify certain action codes that indicate reassignment of the priority associated with the action of the respective processed packet;
changing the priority associated with the action for a given processed packet based on an action code of the given processed packet, wherein the changing includes changing a first priority to a second priority of a priority range;
selecting a decision based on a highest priority; and
providing the decision to a decision processor for performing a selected action associated with the highest priority on the incoming packet.

19. The method of claim 18, wherein the groups include a first group and wherein the first priority is associated with a first packet processor from the first group of the packet processors and the second priority is the highest priority of the priority range associated with the first group.

20. The method of claim 18, wherein the groups include a second group and wherein the processed packet that includes the highest priority corresponds to the second group of the packet processors.

* * * * *